J. WIDMER.
Vegetable Cutter.
No. 33,922. Patented Dec. 10, 1861.
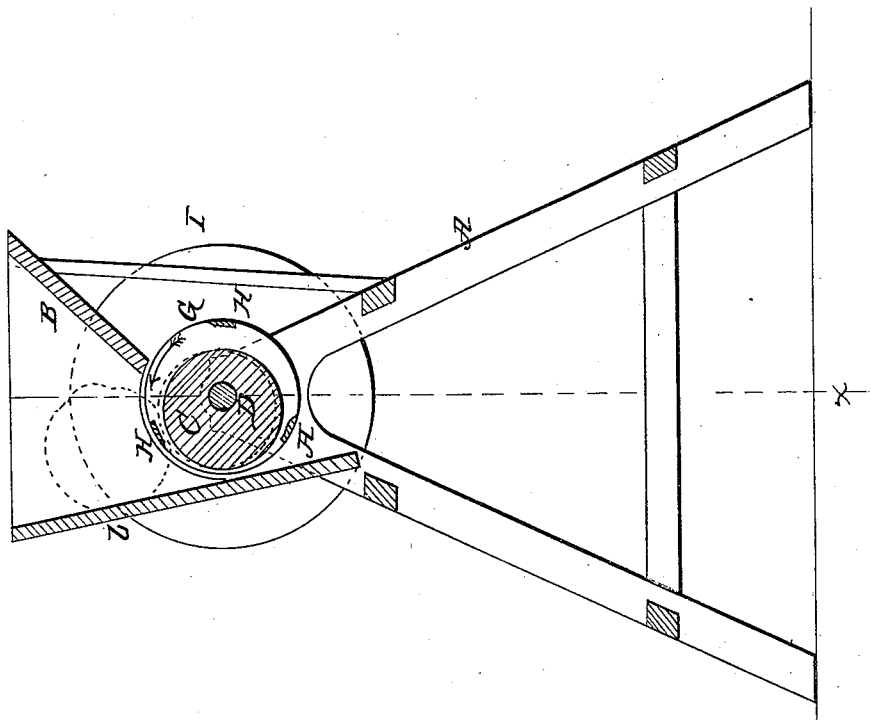
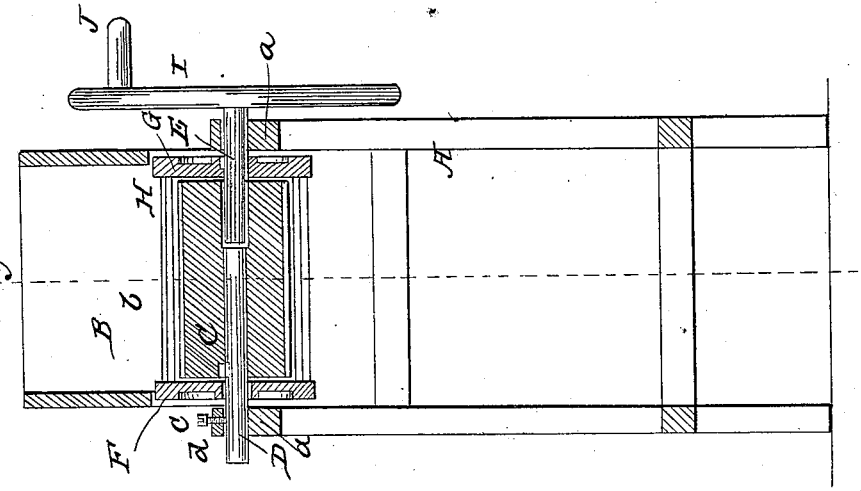
Witnesses
J.W. Coombs.
G.W. Reed.
Inventor
Jacob Widmer
per Munn & Co
Attorneys

UNITED STATES PATENT OFFICE.

JACOB WIDMER, OF NEW HAVEN, CONNECTICUT, ASSIGNOR TO H. B. BIGELOW, OF SAME PLACE.

IMPROVEMENT IN MACHINES FOR CUTTING ROOTS.

Specification forming part of Letters Patent No. 33,922, dated December 10, 1861.

*To all whom it may concern:*

Be it known that I, JACOB WIDMER, of New Haven, in the county of New Haven and State of Connecticut, have invented a new and Improved Machine for Cutting Roots for Cattle or Stock; and I do hereby declare that the following is a full, clear, and exact description of the same, reference being had to the annexed drawings, making a part of this specification, in which—

Figure 1 is a vertical section of my invention, taken in the line $xx$, Fig. 2; Fig. 2, a vertical section of the same, taken in the line $yy$, Fig. 1.

Similar letters of reference indicate corresponding parts in the two figures.

The object of this invention is to obtain a root-cutting machine which will be simple and economical in construction and admit of being very expeditiously adjusted or graduated, so as to cut the roots to any required degree of fineness.

The invention consists in the employment or use of a rotary cylinder of cutters in connection with an eccentric adjustable cylinder and a hopper, all arranged substantially as hereinafter fully shown and described, whereby the desired end is obtained.

To enable those skilled in the art to fully understand and construct my invention, I will proceed to describe it.

A represents the frame of the machine, which may be of V form, with a hopper B in its upper end. C is a cylinder, which is fitted eccentrically on two shafts D E, which are in line with each other and have their bearings $a$ on the upper part of the frame A. The cylinder C is attached to the shaft D; but the shaft E is fitted loosely in the cylinder and is allowed to turn freely in it. The eccentric position of the cylinder C on the shaft D is shown clearly in Fig. 2.

F G are two circular heads or disks, which are fitted one on each shaft D E and adjoining the ends of the cylinder C. The head or disk F is fitted loosely on shaft D; but the head or disk G is permanently attached to the shaft E. The heads or disks F G have knives H attached to them. These knives may be parallel with the axis of the cylinder C or they may have an oblique or spiral position. The shaft E has a fly-wheel I on its outer end, said wheel having a handle J attached.

The operation is as follows: The roots to be cut are placed in the hopper B, and they rest against the side $b$ of the hopper and on the cylinder C, as shown clearly in Fig. 2, a root being shown by dotted lines. The operator turns the shaft E, and thereby rotates the heads or disks F G, and the knives H cut the roots. The roots may be cut coarse or fine, as desired, by adjusting the cylinder C—that is to say, turning it so that its periphery will be nearer to or farther from the side $b$ of the hopper. This will be fully understood by referring to Fig. 2, in which it will be seen that the farther the cylinder C is turned out from the side $b$ of the hopper the coarser the roots will be cut, the roots being cut finer as the cylinder is turned or adjusted toward the side $b$. The cylinder C is prevented from casually turning by means of a set-screw $c$, which passes through the cap $d$ of the bearing of shaft D and is screwed down against said shaft. By unscrewing this screw a trifle the cylinder C may be readily turned and adjusted, as desired.

Having thus described my invention, what I claim as new, and desire to secure by Letters Patent, is—

The adjustable eccentric cylinder C, in combination with the rotating heads or disks F G, knives H, and hopper B, arranged substantially as and for the purpose set forth.

JACOB WIDMER.

Witnesses:
 JNO. G. NORTH,
 GEO. W. BIGELOW.